Patented July 5, 1927.

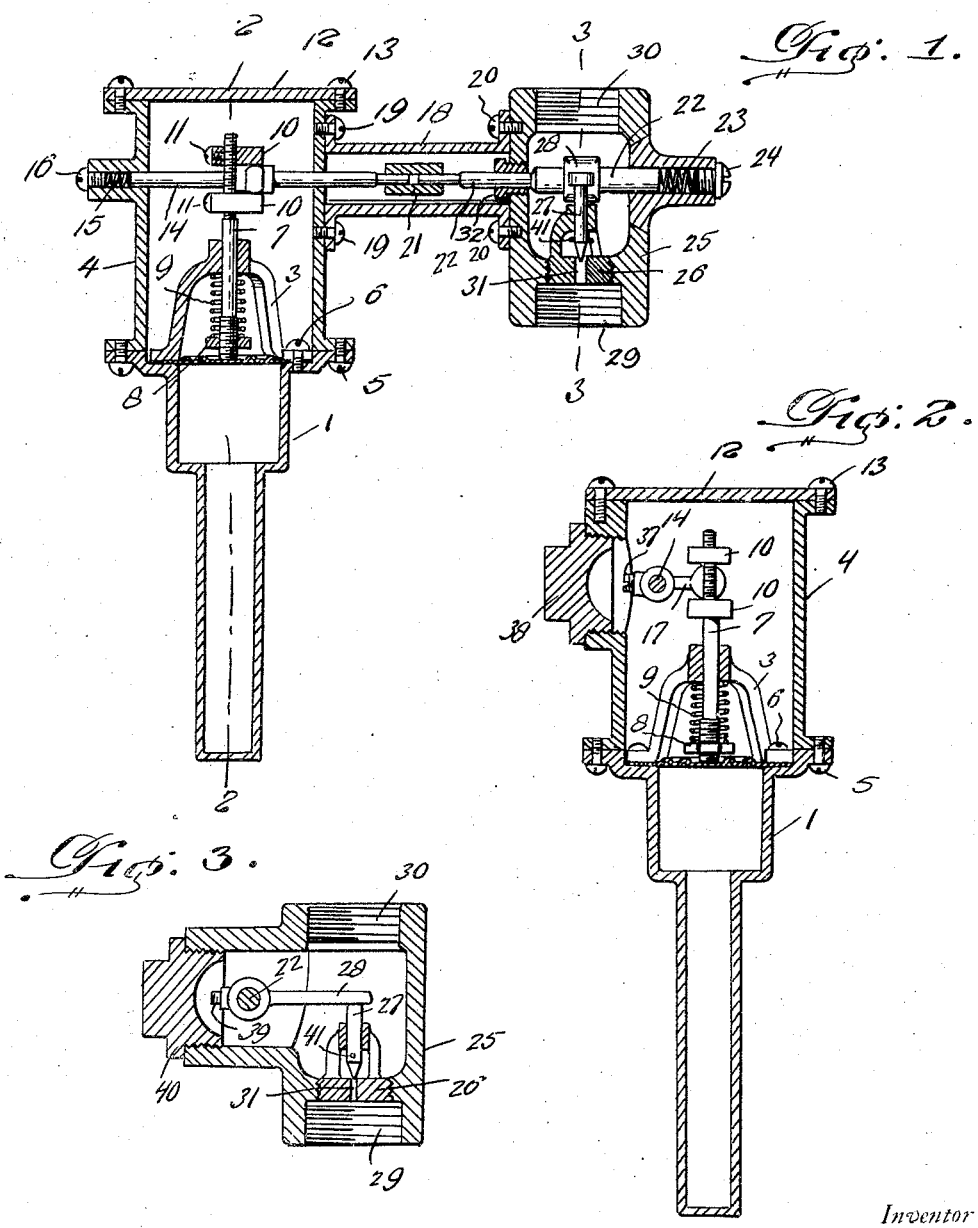

UNITED STATES PATENT OFFICE.

WILLIAM H. THOMAS, 3d, OF LITTLE FALLS, NEW YORK.

AUTOMATIC TEMPERATURE-CONTROL VALVE FOR LIQUIDS OR STEAM.

Application filed April 13, 1926. Serial No. 101,774.

My invention relates to a temperature or thermostatic control valve for controlling the temperature of flowing liquids, for instance, of milk in Pasteurizing process, either to maintain a uniform temperature, to which the milk is heated, or to maintain a uniform temperature to which it is cooled, or both.

The objects of this invention are to provide a simple, direct-acting thermostat that is compact and self-contained, and that can be inserted into the line of pipe through which the fluid, whose temperature is to be controlled, is flowing, and operating directly the valve which controls the steam, in the case of heating, or the brine, or water, in the case of cooling.

For the purpose of disclosing the invention the improvement is illustrated in the accompanying drawings in which:

Figure 1 is a vertical sectional illustration of the control valve assembled for use.

Figure 2 is a section taken substantially on the line 2—2 of Figure 1.

Fig. 3 is a section taken substantially on the line 3—3 of Figure 1.

This invention consists of a bulb 1 or thermostatic element, filled with a fluid and closed at one end by means of a diaphragm 2 so that when this bulb is inserted in the flow line of the liquid, the temperature of the liquid to be controlled, will cause expansion or contraction of the liquid inside the bulb and thereby move inwardly or outwardly the diaphragm 2.

In order to transmit the motion of the diaphragm to the steam or water valve to be controlled, I employ an improved system of contact members and levers that will transmit this motion without loss, and with a minimum of friction or resistance.

This arrangement consists of a contact member 7, held adjustably in contact with the outer side of the said diaphragm by means of a spring 9, locknut 8 and bearing 3 through which said contact member passes; adjustable shoulders 10 on said contact member, which shoulders bear against one end of a series of levers, which multiply the movement of the diaphragm and its contact member the amount necessary to operate directly the steam or water valve that it is desired to control.

The mechanism for transmitting the movement of the diaphragm 2 to the stem of the steam or water valve 27, consists of intermediate or rock shafts 14 and 22 which carry two levers 17 and 28 adjustably secured thereto, one of said levers bearing on the diaphragm contact member 7, and the other on the steam or water valve stem 27, also ground joint bearing 32 for the said intermediate, or rock shaft, which enables same to pass through the walls of the fluid or steam line without leakage and without resorting to stuffing boxes and the friction that they cause.

The ground joint bearing 32 before mentioned consists preferably of a taper seat for the intermediate shaft, provided in bushings and corresponding shoulders on said shaft, and means, such as adjustable springs 15 and 23, for keeping these surfaces in contact.

The motion of the diaphragm 2 from the expansion or contraction of the liquid in bulb 1 is transferred to the steam valve stem 27, which passes through a guide or bearing 26 which is removably secured in the water case 25. There is an opening 31 through guide 26 which makes a seat for valve stem 27. A pin or other stop 41 in valve stem 27 prevents the valve from opening too far. A spacer 18 is fastened to cases 4 and 25. In the arrangement shown in the drawings, the spacer 18 is removably secured by screws 19 and 20 to cases 4 and 25. This spacer makes the assembly a rigid unit not requiring flexible tube connectors between the operating means and the bulb.

A removable covering may be fastened to case 4. This may be of the type shown which is fastened to case 4 by screws 13 or it may be of a screw or plug type.

On the shafts 14 and 22 is a sleeve 21 so made as to allow adjustment endwise of the shafts and still permit the motion imparted to shaft 14 to be transferred to shaft 22. At the ends of the shafts 14 and 22 are the springs to keep these shafts in position. These springs are held in place by screws 16 and 24 and are used due to their ability to keep the shafts in correct position with as little friction as possible.

Cases 4 and 25 are so constructed that the parts of the valves are easily assembled. Openings with plugs 38 and 40 are made in the particular construction shown, through which adjusting or set screws 37 and 39 are readily reached as well as screws 11 in the adjustable shoulders 10.

In operation, the liquid which is to be controlled engages bulb 1. The liquid in passing around bulb 1 heats or cools the liquid with which the bulb is filled, making it expand or contract which action is directly transferred to the diaphragm 2 thus raising or lowering member 7 and shoulders 10 which are fastened thereto. These shoulders being in contact with lever arm 17 impart to it an up and down motion which rocks shaft 14, and through member 21, shaft 22 is given the same motion. Lever arm 28 being fastened to shaft 22 is thus given a downward or upward motion which is transferred to valve stem 27, thus closing or opening the valve and allowing less or more steam or water to be admitted to the heating medium, which in turn lowers or raises the temperature of the liquid.

Steam or water enters case 25 through inlet 29 being controlled in volume by the position of valve stem 27 relative to opening 31, then passing through case 25 to outlet 30 which is connected to the heating medium.

If the temperature of the liquid increases, the expansion of the liquid in bulb 1 is transferred to the steam valve partly shutting it through cutting off the steam and dropping the temperature of the liquid. If the liquid temperature drops, the action is similar, the valve opening and allowing more steam or water to pass through the valve to the heating apparatus, thus raising the liquid temperature. By adjusting position of levers and stops, any desired range of temperature may be maintained.

I claim as my invention:

1. In a thermostatic control valve, a liquid filled bulb to be inserted in a milk or other liquid passage, a metallic diaphragm closure at one end, a rock shaft, a lever extending from the rock shaft, an adjustable contact member fitted so as to transfer any motion of the diaphragm to the rock shaft through the lever, a second rock shaft, a chest, the first rock shaft being adjustably connected to the second rock shaft in the chest, and automatically adjusted taper seat bearing to prevent water or steam leakages around the second shaft, a needle valve, a lever adjustably mounted on the second shaft in contact with the needle valve to which the motion of the diaphragm is transferred in proportion to the length of the two levers.

2. In a device of the class described comprising a thermostatic element, a case, a bearing in the case, a rod slidable through the bearing and engaging the element, a rock shaft in the case, spaced shoulders on the rod, a crank on the rock shaft terminating between the shoulders, a second case, a spacing tube attached to the cases, a valve in the second case, a rock shaft in the second case, both rock shafts extending into the tube, a sleeve connecting the shafts in the tube to allow endwise adjustment of the shafts, thrust springs impinging against the outer ends of the shafts, and a crank on the second shaft for operating the valve.

WILLIAM H. THOMAS, 3RD.